(12) United States Patent
Valerio

(10) Patent No.: US 10,569,281 B2
(45) Date of Patent: Feb. 25, 2020

(54) SYSTEM AND METHOD FOR RECOVERING DESIRED MATERIALS AND PRODUCING CLEAN AGGREGATE FROM INCINERATOR ASH

(71) Applicant: TAV HOLDINGS, INC., Atlanta, GA (US)

(72) Inventor: Thomas Valerio, Atlanta, GA (US)

( * ) Notice: Subject to any disclaimer, the term of this patent is extended or adjusted under 35 U.S.C. 154(b) by 0 days.

(21) Appl. No.: 15/747,738

(22) PCT Filed: Jul. 25, 2016

(86) PCT No.: PCT/US2016/043789
§ 371 (c)(1),
(2) Date: Jan. 25, 2018

(87) PCT Pub. No.: WO2017/019578
PCT Pub. Date: Feb. 2, 2017

(65) Prior Publication Data
US 2018/0214891 A1 Aug. 2, 2018

Related U.S. Application Data

(60) Provisional application No. 62/196,978, filed on Jul. 25, 2015.

(51) Int. Cl.
| | | |
|---|---|---|
| B03B 9/04 | (2006.01) | |
| B03B 4/00 | (2006.01) | |
| B03C 1/02 | (2006.01) | |
| B07C 5/342 | (2006.01) | |

(52) U.S. Cl.
CPC ............... *B03B 9/04* (2013.01); *B03B 4/005* (2013.01); *B03C 1/02* (2013.01); *B07C 5/342* (2013.01); *B03C 2201/20* (2013.01)

(58) Field of Classification Search
CPC ........................................................ B03B 9/04
USPC ................... 209/11, 12.1, 38, 44.2
See application file for complete search history.

(56) References Cited

U.S. PATENT DOCUMENTS

| | | | | |
|---|---|---|---|---|
| 4,363,722 A | * | 12/1982 | Dresty, Jr. ................ | B03B 4/00 209/3 |
| 4,815,667 A | * | 3/1989 | Keller ...................... | B02C 4/12 241/14 |
| 5,174,509 A | * | 12/1992 | Starke ...................... | B03B 9/04 241/24.14 |
| 5,356,082 A | * | 10/1994 | Prinz ........................ | B03B 9/04 241/24.13 |

(Continued)

FOREIGN PATENT DOCUMENTS

| | | |
|---|---|---|
| DE | 4123277 C1 | 5/1993 |
| WO | 0003807 A1 | 1/2000 |
| WO | 2014056065 A1 | 4/2014 |

OTHER PUBLICATIONS

International Search Report, dated Oct. 14, 2016.

*Primary Examiner* — Terrell H Matthews
(74) *Attorney, Agent, or Firm* — Nigamnarayan Acharya; Lewis Brisbois Bisgaard & Smith LLP

(57) ABSTRACT

Devices, systems, and methods for separating incinerator combined ash to recover desired materials are described. The devices, systems, and methods may include 2-stage screen(s), falling velocity separator(s)/jig(s), magnetic pulley(s), eddy current separator(s), sensor sorters, and optical sorter(s).

11 Claims, 3 Drawing Sheets

(56) References Cited

U.S. PATENT DOCUMENTS

| | | | | |
|---|---|---|---|---|
| 5,992,776 | A * | 11/1999 | Arcaini | B03B 9/04 |
| | | | | 241/77 |
| 6,666,335 | B1 * | 12/2003 | Bradley | B01D 21/0042 |
| | | | | 209/10 |
| 2008/0139868 | A1 * | 6/2008 | Forrester | B03B 9/04 |
| | | | | 588/256 |
| 2013/0181075 | A1 * | 7/2013 | Pickens | B03B 9/04 |
| | | | | 241/14 |
| 2015/0136662 | A1 | 5/2015 | Valerio | |
| 2015/0258552 | A1 * | 9/2015 | Warkentin | A62D 3/33 |
| | | | | 106/638 |
| 2017/0305038 | A1 * | 10/2017 | Paspek | B02C 23/08 |

* cited by examiner

SYSTEM AND METHOD FOR RECOVERING DESIRED MATERIALS AND PRODUCING CLEAN AGGREGATE FROM INCINERATOR ASH

CROSS-REFERENCE TO RELATED APPLICATIONS

This application claims priority to and the benefit of U.S. Patent Application No. 62/196,978, filed Jul. 25, 2015, which is incorporated herein by reference in its entirety.

TECHNICAL FIELD

This disclosure generally relates to separation techniques. More particularly, this disclosure relates to methods and systems for recovering materials from incinerator ash and producing a clean aggregate.

BACKGROUND

Millions of tons of municipal solid waste are produced every year. Waste management and utilization strategies are major concerns in many countries. Incineration is a common technique for treating waste, as it can reduce waste mass by 80% and volume by up to 90% and can allow recovery of energy from waste to generate electricity.

To use the incinerator waste and reduce the environmental impact, treatment methods have been introduced and the waste has been classified and separated to promote recovery. There is always a need for improved methods for separating and classifying incinerator waste, including incinerator combined ash.

SUMMARY

This disclosure generally provides systems and methods for separating incinerator combined ash to recover desired materials and produce a clean aggregate. The devices, systems, and methods may include 2-stage screen(s), falling velocity separator(s)/jig(s), magnetic pulley(s), eddy current separator(s), sensor sorters, and optical sorter(s), particularly for glass.

One aspect includes a method for separating incinerator combined ash and preparing clean aggregate having the steps of combining the ash with water, screening the ash using a 2-stage screen to collect a first material of less than 100 mm, sizing the incinerator combined ash using at least one 2-stage screen to recover a first material less than about 35 mm, sizing the first material into discrete sizes, separating the first material faction using a first falling velocity separator operating at or about 3.2 specific gravity. There is a first heavy fraction and a first light fraction from this step. The method can include separating the first light portion using a second falling velocity separator operating at less than about 2.2 specific gravity, wherein there is a second heavy fraction that has a specific gravity greater than about 2.2 specific gravity and a second light fraction. The second heavy fraction can be magnetically separated to recover ferromagnetic metals. The method can include using eddy currents to remove aluminum, brass and copper; and using on the third heavy fraction a sensor sorter and an optical sorter capable of sorting glass based on the transparency or lack of transparency. The product can be glass and a metal-free and glass-free aggregate.

Another aspect includes a system for preparing clean aggregate from incinerator ash materials. In one example, the components of the system are able to execute the steps in the methods disclosed herein. The product is an essentially metal and glass-free aggregate.

BRIEF DESCRIPTION OF THE DRAWINGS

This disclosure is illustrated in the figures of the accompanying drawings which are meant to be illustrative and not limiting, in which like references are intended to refer to like or corresponding parts, and in which.

DETAILED DESCRIPTION

Generally, this application relates to systems and methods for recovering desired materials from incinerator ash, including but not limited to, incinerator combined ash. The systems and methods may include 2-stage screen(s), falling velocity separator(s)/jig(s), magnetic pulley(s)/magnet(s), eddy current separator(s), sensor sorters, and optical sorter(s).

Figure 1:
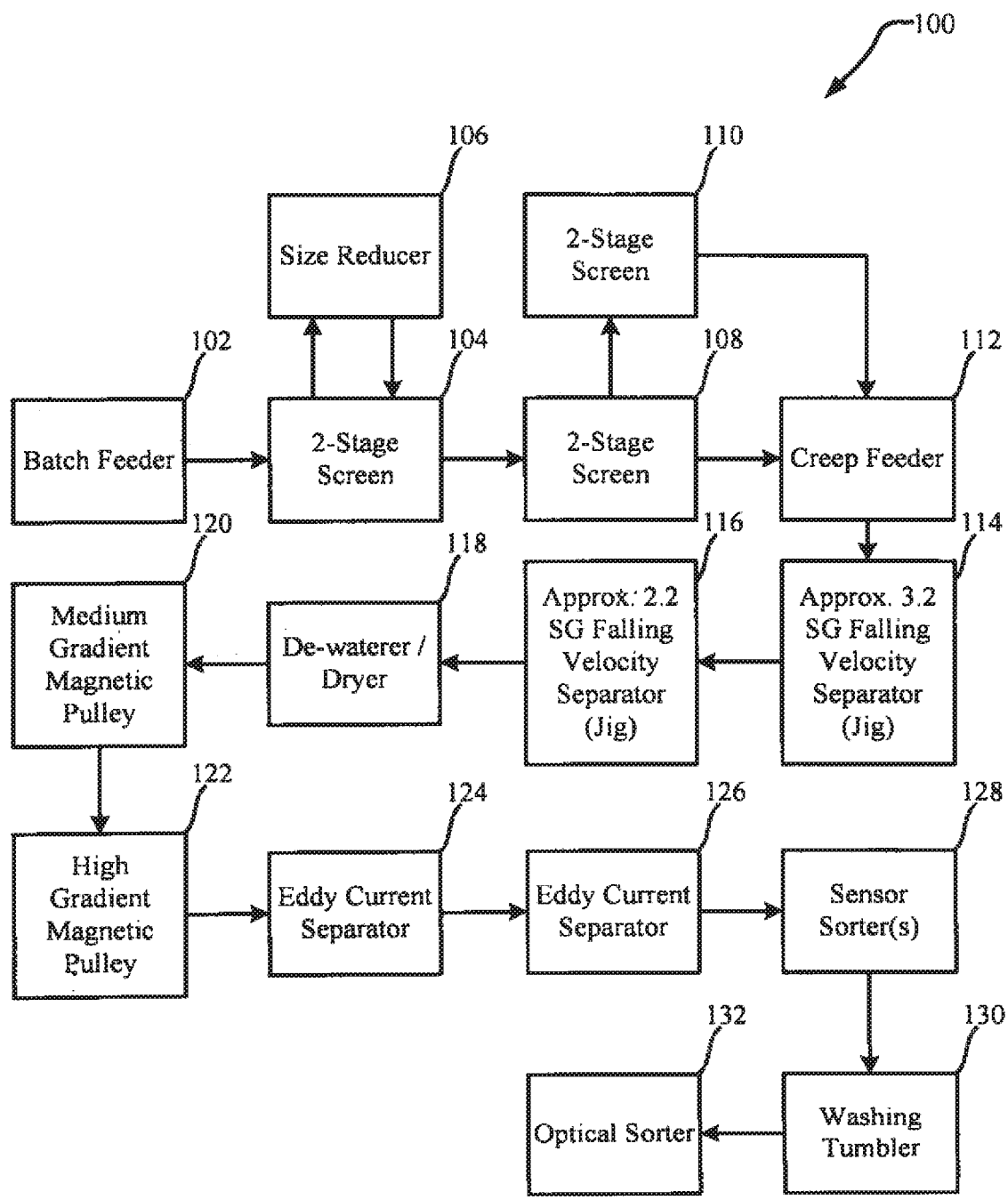
FIG. 1 illustrates an exemplary equipment layout diagram (as a flow diagram) for an incinerator combined ash processing system in accordance to this disclosure.

FIG. 1 illustrates an exemplary system 100 for separating incinerator combined ash to obtain desired materials. A batch feeder 102 dispenses incinerator combined ash or other similar waste containing various sizes of materials into a 2-stage screen 104. The 2-stage screen 104 has a screen that allows materials about 100 millimeters (mm) or less to pass through and a screen that allows materials about 35 mm or less to pass through. Materials greater than about 100 mm are removed from the system 100 for further manual and/or automatic processing. In this example, materials having a size of about 35 mm to about 100 mm are sent to a size reducer 106, which reduces the about 35 mm to about 100 mm materials into smaller sized materials. The size reducer 106 may be a ball mill (e.g., a wet-rubber ball mill), crusher (e.g., a jaw crusher), shredder (e.g., a vertical or horizontal shredder), or like apparatus capable of reducing the size of the materials sent to the size reducer 106. Upon the materials being reduced in size, the materials may be sent back to the 2-stage screen 104 for further separation. Both crushing and grinding lead to size reduction of the material or to "comminution". The comminuted material may be conveyed to a size separator that fractionates the material by size to produce two or more sized waste streams (e.g., at least an over fraction and an under fraction). Comminution (e.g., shredding or grinding) may be carried out to improve the efficiency of size separation and density separation.

In one example, materials smaller than about 35 mm are sent from the 2-stage screen 104 to another 2-stage screen 108 having screens that allow materials about 6 mm or less to pass through and materials about 2 mm or less to pass through, respectively. Materials larger than about 6 or 10 mm are sent from the 2-stage screen 108 to another 2-stage screen 110 where the materials larger than about 6 or 10 mm are further separated using a screen with about 17 mm holes and a screen with about 25 mm holes. Materials about 2 mm and smaller are removed from the system 100 for further manual and/or automatic processing, such as fines processing, for example. This screening step may be performed with or without water, that is, it may be a "wet" screen or a "dry" screen.

The materials can be segregated into discrete size ranges based on, e.g., commercially available equipment and specifications. Exemplary and illustrative size ranges include about 2 to about 6 mm, about 6 to about 10 mm, about 10 mm to about 17 mm. about 17 mm to about 25 mm. about 25 mm to about 35 mm, and about 35 mm to about 100 mm. Materials about 100 mm and greater are removed from the system 100 through manual or automatic processing. An exemplary optimal size ratio upon segregation is about 3:1. Separation of the materials into discrete batch size ranges provides more effective processing at later processing stages of the system 100. More particularly, each fraction can be batched through system 100 to promote efficiency. In one embodiment, the ratio of the upper cut to lower cut may be less than 4.

The sized or discretely sized materials, e.g., of about 2 mm to about 6 mm, can be sent to a creep feeder 112 and the materials are then transported to a falling velocity separator/jig 114. Exemplary jigs are able to separate light and heavy particles/materials using their abilities to penetrate an oscillating fluid bed supported on a screen. The falling velocity separator 114 may operate at or about 3.2 specific gravity ("SG"). Materials having an SG about 3.2 or greater (i.e., metals such as ferrous, non-ferrous metals, and precious metals) are separated and removed from the system 100. Materials having an SG about 3.2 or smaller are sent to another falling velocity separator 116 to, e.g., remove additional metals.

The materials, segregated in discrete sizes, can be processed by the falling velocity separator 116. The falling velocity separator 116 operates at or about 2 SG. Both the falling velocity separators 114, 116 may be jigs. Materials having an SG about or less than 2 (i.e., light organics, ash, unburnt waste, and waste) are removed from the system 100, which increases the purity of the materials to be processed. Materials having an SG about or greater than 2 are removed from the falling velocity separator 116 for de-watering and drying at a dryer 118. For example, drying may take place via the use of a machine/apparatus, or drying may occur through natural means, such as heat from the sun.

After de-watering and drying, the materials having an SG about or greater than 2 are sent to a medium intensity magnetic pulley/magnet 120 where ferrous metals are separated and removed from the system 100. The medium intensity magnetic pulley/magnets 120 may provide field strengths of about 500 gauss to about 2000 gauss. A substantially non-ferrous composition of materials are sent, after separation using the medium/low intensity magnetic pulley or magnets 120, to a high intensity magnetic pulley 122 where substantially all or all of the ferrous material left in the composition is separated and removed from the system 100. The high intensity magnetic pulley or magnet 122 may provide field strengths of about 2000 gauss and greater. The remaining non-ferrous materials are sent to an eddy current separator 124 where non-ferrous metals (e.g., aluminum) are separated and removed from the system 100. An eddy current separator can use a powerful magnetic field to separate non-ferrous metals from waste after all ferrous metals have been removed previously by some arrangement of magnets. For example, the eddy current separator can recover non-ferrous metals such as aluminum, brass and copper. In one example, the eddy current separator(s) can have a frequency greater than 800 hertz or greater than 1 kilohertz.

Materials remaining in the separation stream (i.e., drops) can be sent to another eddy current separator 126. The drops are substantially or wholly composed of non-ferrous/inert materials. At the eddy current separator 126, any remaining non-ferrous metals within the drops are separated out and removed from the system 100. The resulting drops are subsequently sent to sensor sorter(s) 128 where metallic materials remaining in the drops are isolated. Sensors suitable with this embodiment include both dynamic and inductive sensors. Optionally, the metallic material can be then sent to one of the 2-stage screens 104, 108, 110 so the metallic material can be further separated using the system 100. The metallic may be removed from the system 100.

The remaining non-metallic composition is sent from the sensor sorter(s) 128 to a washing tumbler 130 and subsequently to an optical sorter 132. Optical glass sorters are capable of sorting glass based on the transparency or lack of transparency of the material. The glass has significant commercial value. At the optical glass sorter 132, the non-metallic composition is separated into a glass portion and a clean aggregate portion, which are both removed from the system 100. Optical sorters can operate by scanning the waste in a free fall using a camera sensor that detects the material and using air jets to eject the material. There are also optical sorters that utilize near infrared, X-Ray and other scanning technologies to separate targeted materials from mixed streams. Any number of optical sorters can be used in series or parallel.

The result of the method/process includes recovered metals and a clean aggregate. The clean aggregate may meet commercial standards and has commercial value.

Figure 2:
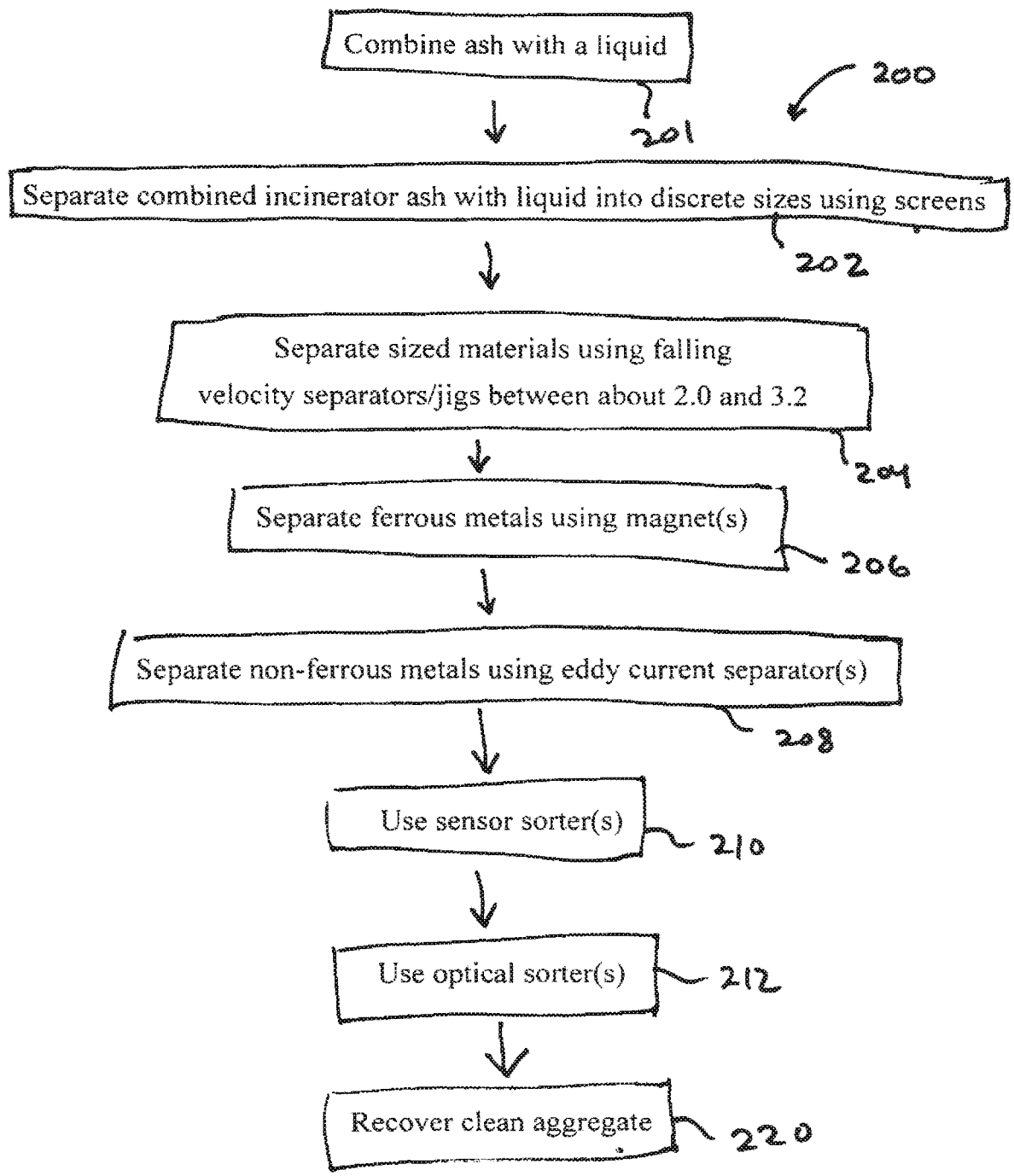
FIG. 2 is a process flow diagram illustrating a method of incinerator combined ash processing according to this disclosure.

Referring to FIG. 2, an exemplary method 200 for processing incinerator combined ash is described. At block 201, the incinerator ash may be combined with a liquid (e.g., water). At block 202 incinerator combined ash is separated using at least one 2-stage screen. Potential screen hole sizes include about 100 mm, about 35 mm, about 6 mm, and about 2 mm. Upon completion of separation of the incinerator combined ash, material sizes remaining in the system are preferably ranged between about 2 mm to about 35 mm. The materials can be segregated into discrete size ranges based on, e.g., commercially available equipment and specifications.

In an example, a single 2-stage screen with at least one screen having holes about 2 mm in size is implemented. In other examples, multiple 2-stage screens are used, with at least one of the screens of the 2-stage screens having about 2 mm holes. At block 204 the about 2 mm to about 35 mm materials are separated using at least one falling velocity separator (jig). The about 2 mm to about 35 mm materials may be received by the falling velocity separator(s) all at once, or may be received according to size. For example, materials about 2 mm to about 6 mm, about 6 mm to about 12 mm, about 12 mm to about 25 mm, and about 25 mm to about 35 mm may be discretely received by the falling velocity separator(s) individually. In another example, metals (ferrous, non-ferrous, and precious) having an SG about or greater than 3.2, and lights (organics, ash, unburnt materials, and waste) having an SG about or less than 2 may be removed from processing at the falling velocity separator(s). Transfer of the materials from the 2-stage screen(s) to the falling velocity separator(s) may include the use of a creep feeder.

At block 206 materials having about 2.0 SG to about 3.2 SG are separated using at least one magnetic pulley/magnet. Exemplary magnetic pulleys include medium and high intensity pulleys. At the magnetic pulley(s), ferrous metals are removed from the about 2 SG to about 3.2 SG materials, leaving non-ferrous materials within the processing stream. At block 208 at least one eddy current separator is used to separate the non-ferrous materials. For example, the eddy current separator(s) separates ferrous metals from the non-ferrous materials and the processing stream, leaving drops in the processing stream. At block 210 sensor sorter(s) isolate out remaining metallic or metallic materials within the drops. These isolated metallics/metallic material may be crushed and re-processed according to the method 200 disclosed herein. At block 212 the drops are further separated using an optical sorter. Prior to arriving at the optical sorter, the drops may be washed at a washing tumbler (not illustrated). At the optical sorter, the drops are separated into a glass portion and a clean aggregate, which can be recovered 220.

Figure 3:
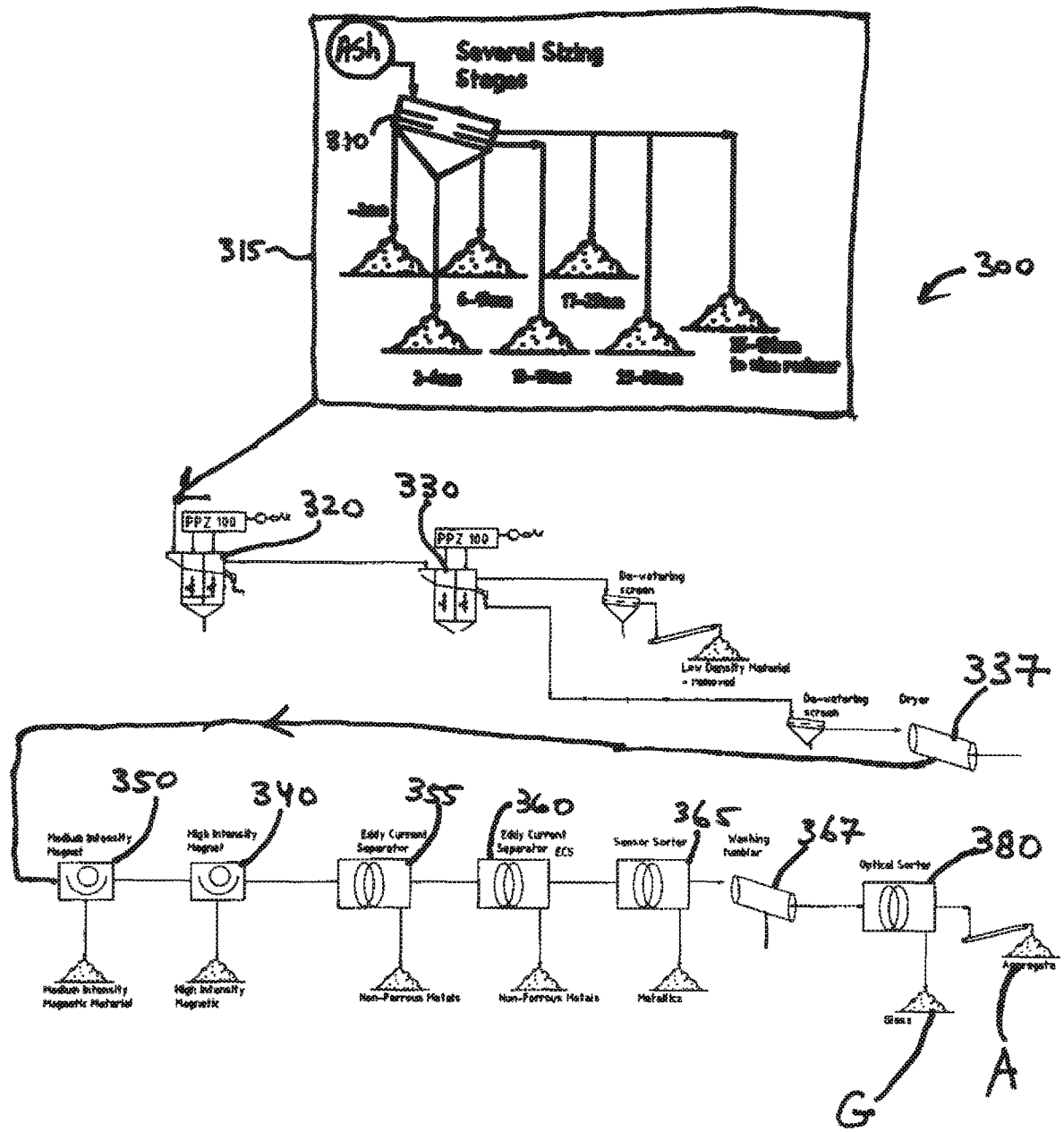
FIG. 3 illustrates an example equipment layout diagram of a system.

FIG. 3 illustrates an example of an equipment layout diagram of a system. A system 300 for preparing clean aggregate from incinerator ash materials can have a batch feeder to combine the ash with water a size reducer 310, a 2-stage screen that allows discretely sized incinerator ash materials 315 of about 100 millimeters (mm) or less to pass through a first screen, a first falling velocity separator 320 operating at about 3.2 SG, a second falling velocity separator 330 operating at about 2.2 SG, a high intensity magnet 340, a low intensity magnet 350, a first eddy current separator 355 having a frequency greater than 800 hertz, a second eddy current separator 360 having a frequency greater than 1 kilohertz, a sensor sorter 365, a tumbler 367, and an optical sorter 380. The size reducer can be selected from the group consisting of a ball mill, a crusher, and shredder. The high intensity magnet can have strength greater than 2000 gauss. The sensor sorter can be a dynamic sensor or an inductive sensor. The first and second falling velocity separators are jigs. The system can include a dryer 337. At the optical sorter, the drops are separated into a glass G and a clean aggregate A.

Certain embodiments can be useful in recovering high value recyclables are present in very low concentrations in incinerator ash, including combined ash. In one embodiment, the incinerator ash may include at least one type of recoverable metal or material at a concentration less than 10%, less than 4% or 5%, or even less than 1%, and the system or method can be used to recover at least 50%, at least 70%, at least 80%, or at least 90% of the particular recoverable material or metal. The aggregate or product may be essentially metal and/or glass free (e.g., less than 1% or less than 0.01% metal or glass free).

Although specific embodiments of the disclosure have been described above in detail, the description is merely for purposes of illustration. It should be appreciated, therefore, that many aspects of the disclosure were described above by way of example only and are not intended as required or essential elements of the disclosure unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A method for separating incinerator combined ash and preparing clean aggregate, comprising: combining the ash with a liquid, screening the ash using a 2-stage screen to collect a first material of less than 100 mm, sizing the first material using at least one 2-stage screen to collect that first material less than about 35 mm, sizing the first material into discrete sizes, separating the first material using a first falling velocity separator operating at about 3.2 specific gravity, wherein there is a first heavy fraction and a first light fraction, separating the first light fraction using a second falling velocity separator operating at about less than about 2.2 specific gravity, wherein there is a second heavy fraction has a specific gravity greater than about 2.2 specific gravity and a second light fraction, magnetically separating the second heavy fraction to recover ferromagnetic metals to prepare a third heavy fraction, magnetically separating the third light fraction to recover ferromagnetic metals, using a first eddy current having a frequency greater than 800 hertz to the third heavy fraction to remove aluminum, brass and copper, using a second eddy current having a frequency greater than 1 kilohertz to the third heavy fraction to further remove aluminum, brass and copper, using on the third heavy fraction a sensor sorter and an optical sorter capable of sorting glass based on the transparency or lack of transparency, wherein the glass is recovered from the third fraction and the third fraction is essentially the metal-free and glass-free aggregate.

2. The method as claimed in claim 1, wherein the second magnet has strength greater than 2000 gauss.

3. The method as claimed in claim 1, wherein the first magnet has strength less than 2000 gauss.

4. The method as claimed in claim 1, wherein the discrete sizes are in a ratio of about 3.

5. The method as claimed in claim 1, wherein the second falling velocity separator operates at a specific gravity of about 2.2.

6. The method as claimed in claim 1, wherein the sensor sorter is a dynamic sensor.

7. The method as claimed in claim 1, wherein the sensor sorter is an inductive sorter.

8. The method as claimed in claim 1, further comprising de-watering the second light fraction.

9. The method as claimed in claim 1, wherein the discrete sizes are about 0-2 mm, about 6-10 mm, about 10-17 mm, 17 mm-25 mm, 25-35 mm, 35-100 mm.

10. The method as claimed in claim 9, wherein the first material between about 35 and 100 are comminuted to a size less than about 35 mm.

11. The method as claimed in claim 1, wherein the metal content of the ash is greater than 4% and the metal content of the aggregate is less than 0.1%.

* * * * *